3,349,006
PROCESS AND COMPOSITION FOR THE ENZYMATIC DETERMINATION OF URIC ACID
Harry Gregory Albaum, Rockville Centre, N.Y., assignor to Miles Laboratories, Inc., Elkhart, Ind., a corporation of Indiana
No Drawing. Filed June 17, 1963, Ser. No. 288,498
10 Claims. (Cl. 195—103.5)

This invention relates to an improved diagnostic composition and method for the detection of uric acid. In particular, this invention is concerned with a diagnostic test useful in the quantitative determination of uric acid in blood.

Uric acid, 2,6,8-trioxypurine, which has the structural formula

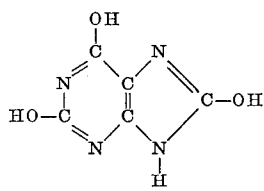

is an end product of nitrogen metabolism in man. The nuclei of all cells are rich in nucleic acids linked to proteins as nucleoproteins. Nucleic acids are readily hydrolyzed to compounds termed nucleotides which are combinations of purine or pyrimidine bases with phosphoric acid and a pentose, D-ribose. Enzymes present in the body constantly break down nucleoproteins and liberate the purine and pyrimidine compounds which may be further metabolized. The chief purines present are adenine and guanine. The chief pyrimidines are thymine, cytosine and uracil.

Nucleoproteins ingested in the diet are broken down during digestion to form these and other purine and pyrimidine bases.

During metabolism the purine bases undergo deamination and partial oxidation to uric acid. In man, uric acid is a recognized end product of nucleoprotein metabolism and is excreted in the urine, but in most mammals the uric acid undergoes a further stage of oxidation to allantoin.

Ingestion of purine-containing food normally has no effect on blood uric acid except in cases of renal insufficiency in which event the blood uric acid content is elevated. In certain other pathological conditions which have not been connected with dietary ingestion of purine-containing food, for example, uremia, leukemia, pneumonia and gout, there is an abnormal increase in the amount of uric acid found in the blood. It is known, for example, that the blood uric acid content is raised in conditions associated with excessive destruction of the nuclei of white blood corpuscles, for example, leukemia and pneumonia.

Medical science has long recognized the usefulness of tests for uric acid in the blood as an aid in diagnosing the foregoing conditions and, in some instances, distinguishing between closely related abnormal conditions, for example, gout and arthritis. Gout is characterized by abnormal increases in blood uric acid whereas arthritis does not exhibit such increases. As may be appreciated it is considered extremely desirable to provide a simple and economical test for a precise quantitative determination of uric acid in the blood.

Uric acid is normally found in the blood in varying small quantities, that is, between about 0.7 and 3.7 mg./100 cc. (milligram percent=mg. %). In the abnormal conditions enumerated above, the uric acid levels of the blood often attain values of 27 mg. percent or higher.

A number of tests, techniques and methods have been proposed and are being used to measure or estimate the amount of uric acid in the blood. Among the known techniques and more widely used conventional methods are colorimetric procedures utilizing blood filtrates. Some of these procedures depend upon the precipitation of uric acid from the blood filtrate, for example, as the silver salt, the uric acid being measured colorimetrically by either a phosphotungstic or arsenotungstic reaction. Other well known methods utilizing blood filtrate depend upon the direct treatment of the filtrate with a tungstic acid in the presence of a cyanide-urea solution to develop a color which is then read in a photometer.

More recently a method has been proposed which contemplates the enzymatic conversion of uric acid present in the blood specimen to allantoin, the reaction being carried out in a spectrophotometer to measure the disappearance of the uric acid spectrum during its conversion to allantoin. This procedure, while providing more precise determinations than other known methods, requires highly skilled laboratory personnel and a great deal of time to perform.

The known methods of blood uric acid determination suffer from one or more of the disadvantages of requiring highly skilled laboratory techniques, requiring a great deal of time to perform, not giving consistently precise results and needing to be carried out within extremely narrow time limitations. It is also to be noted that known methods depend upon the detection of uric acid per se or its rate of conversion to other substances.

In accordance with this invention, I have discovered a simple, practical and economical diagnostic colorimetric method for detecting the presence of uric acid in blood and making a precise quantitative determination thereof. This method does not depend upon the detection of uric acid per se nor its rate of disappearance in a conversion reaction and may be conducted by personnel unskilled in laboratory techniques. The method offers the advantages of extremely rapid color development and the maintenance of maximum color value for an extended period of time.

My invention is based upon the discovery that the amount of hydrogen peroxide produced in the enzymatic conversion of uric acid to allantoin is directly proportional to the amount of uric acid present in the blood. The hydrogen peroxide produced then can be detected by means of a color change produced upon oxidation of a color-forming substance in the presence of a substance having peroxidative activity. It is theorized that the general reactions occurring are as follows:

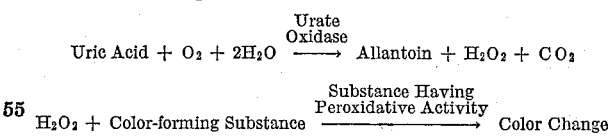

Heretofore, it has not been possible to accurately measure the amount of hydrogen peroxide produced in the conversion reaction for the reason that blood serum contains enzymes, for example, catalase, which destroy hydrogen peroxide as it is formed. This problem has been successfully overcome by the compositions and methods of this invention.

Broadly, this invention comprises the combination of a system for generating hydrogen peroxide from uric acid and a system for measuring the amount of hydrogen peroxide thereby produced.

The hydrogen peroxide generating system comprises the uric acid enzyme, urate oxidase, sometimes known as uricase, a catalase inhibiting substance and a buffer providing a pH range near the optimum pH at which the urate oxidase is effective to convert the uric acid present in the blood serum specimen being tested to allantoin with the concomitant production of hydrogen peroxide.

The hydrogen peroxide detecting system may comprise a color indicator or chromogen, the color of which is affected by hydrogen peroxide, a substance having peroxidative activity, and a buffer providing a pH range at which the substance having peroxidative activity is capable of catalyzing the oxidation of the color indicator by hydrogen peroxide to produce an observable color change. Other systems for detecting hydrogen peroxide may be used if desired.

In order to test for the presence of uric acid in blood serum according to this invention, the uric acid present in the blood is first converted to allantoin utilizing the hydrogen peroxide generating system. Thereafter the hydrogen peroxide detecting system is used to determine the amount of hydrogen peroxide produced in the conversion of uric acid to allantoin. The color developed by the color indicator in the hydrogen peroxide detecting system may then be compared with a calibrated color chart or standard color samples to determine the amount of uric acid originally present in the specimen.

In general, it is preferred that the hydrogen peroxide generating reaction be completed within a period of about five minutes or less in order to obtain the utmost convenience in conducting the test as well as to minimize the amount of enzyme dissociation which increases with time. To this end the concentration of urate oxidase may be adjusted so that the maximum concentration of uric acid which may be encountered in blood serums is quantitatively converted to allantoin in a period not exceeding about five minutes.

The enzyme urate oxidase may be obtained from the liver or kidneys of any animal which is able to convert uric acid to allantoin, for example, from porcine or bovine sources.

Since this enzyme has a maximum activity in the range of about from pH 9.0 to pH 9.2 in the above time range, it is desirable to use with the urate oxidase a buffer which is effective to maintain the composition within that pH range. Buffers which may be used include, for instance, borate buffer, glycine and tris(hydroxymethyl)aminomethane. The concentration of the buffer is not critical. However, it is preferred to use a relatively dilute buffer solution and for this purpose a 0.1 M solution is recommended.

Since blood serum contains the enzyme catalase, which as pointed out above destroys hydrogen peroxide, it is necessary to include in the formulation for the generation of hydrogen peroxide a catalase inhibiting substance. For this purpose sodium azide is especially recommended. Cyanides such as potassium cyanide and sodium cyanide may also be used if desired.

In many instances, it has been found desirable to include with the hydrogen peroxide generating system a stabilizing agent for the urate oxidase. Since urate oxidase in dilute solution is sensitive to traces of metallic ions, it is desirable to stabilize the urate oxidase, using for this purpose any standard chelating agent such as ethylenediamine, 1,2-propylenediamine or other diamines or substituted diamines which are effective to prevent inhibition of urate oxidase by bivalent and other multivalent metal ions. A preferred stabilizing agent, for example, is ethylenediaminetetracetic acid.

The generating system formulated as above described may be used or furnished in various forms. For example, the ingredients may be mixed in liquid form or, depending upon the availability of solid enzymes, in powder form. The liquid formulation may then be lyophilized to give a formulation which may be readily reconstituted for later use simply by the addition of water. The powders if desired may be tableted for convenience in use. Other forms may also be used depending upon considerations of convenience and especially for stability, packaging and storage.

The detecting system which is used to determine quantitatively the amount of hydrogen peroxide produced in the urate oxidase catalyzed oxidation of uric acid to allantoin generally comprises a chromogen, a substance having peroxidative activity which is capable of catalyzing the oxidation of the chromogen by hydrogen peroxide to effect a color change and a buffer to provide a pH at which the chromogen oxidation may be effectively carried out.

With respect to the buffering of the detecting system, it is desirable to provide a pH in the range of about from pH 4.5 to pH 5.5. For this purpose buffers which may be used may include citrate, succinate, tris(hydroxymethyl)methylamine glutamate and tris(hydroxymethyl)methylamine malonate as well as other buffers which are generally effective within the pH range of about from pH 4.5 to pH 5.5. One reason for requiring a pH within the acid range is to insure that the most stable color is developed. It has been observed that at higher pH's the color fades very rapidly.

Although as pointed out above, the range of concentrations of the various ingredients in both the generating system and the detecting system are not critical, certain guide-lines may be established in this regard. The various materials are in general used in a concentration such that the range of concentrations of uric acid to be detected is covered by this range. Beyond this, ranges in the reagent systems are not particularly critical. However, with respect to the buffer, it has been found that upon addition of the second buffer to lower the pH to one within the range of about from pH 4.5 to pH 5.5 the ratio of the quantity of this buffer to the alkaline buffer used for the generating system, assuming the same molar concentration for both buffers, generally approximates 3:1.

Various chromogens or color forming materials or color indicators may be used to provide a visual measure of the quantity of hydrogen peroxide produced by the generating system. In particular, a variety of organic materials, principally those of aniline and phenolic derivation may be used. For instance, one can mention ortho-tolidine, orthotoluidine, p-toluidine, o-phenylenediamine, N,N'-dimethyl-p-phenylenediamine, benzidine, o-anisidine, p-anisidine, dianisidine, o-cresol, m-cresol, alpha and beta-naphthols, catechol, guaiacol, pyrogallol, 2,7-diaminofluorene, leucoindophenols and gum guaiac. The only limiting factor with respect to the chromogen is that the chromogen must undergo a color change in the presence of hydrogen peroxide and a substance having peroxidative activity acting as a catalyst for the oxidation.

The enzyme peroxidase is one of a group of materials known to have peroxidative activity, that is, having the capacity to catalyze the reaction of various chromogenic materials by hydrogen peroxide. Peroxidase may be obtained from horseradish or fig leaves or from potatoes. Other materials known to have peroxidative activity as above defined include, for example, normal whole blood, red blood cells, lyophilized whole blood and similar metalloporphyrin materials, both natural and synthetic. A mixture of potassium iodide and sodium molybdate as well as other water-soluble iodides such as sodium iodide and ammonium iodide and other soluble molybdates such as potassium molybdate and ammonium molybdate may also be used. In addition sodium molybdate and other molybdates may be used alone if desired. Urohemin and other porphyrin substances known to be effective for catalyzing oxidation reactions may also be used. In the case of the metalloporphyrins, although hemin is preferred, various complex forming compounds which activate certain other metalloporphyrins not operable per se can be used in combination with such other metalloporphyrins to produce an effective catalytic system. Such materials include 2-aminobenzothiazole, pyridine, bipyridyl, bipyridylpyridine, nicotinic acid and the like. Other substances which are non-enzymatic in character but which are effective in catalyzing the desired oxidation reaction include such compounds as iron sulfocyanate, iron tannate, ferrous ferrocyanide, potassium chromic sulfate and others.

The detecting system as above formulated may be provided in various usable forms. For instance, the system may be furnished as a liquid, as a lyophilized liquid or as a lyophilized powder. If desired the materials in dry form may be mixed and used as a powder or tableted for convenient use in the form of tablets. Another form in which the detecting system may be utilized is as sticks or strips of bibulous material such as absorbent paper upon which has been impregnated the dried residue of the detecting formulation in liquid form. Various other forms may be used as well.

The following examples will illustrate the formulation and use of the improved diagnostic compositions of the present invention.

*Example 1*

The following formulation was mixed, lyophilized and reconstituted with water:

|  | Ml. |
|---|---|
| Sodium borate buffer (0.1 M, pH 9.2) | 0.1 |
| Ethylenediaminetetracetic acid (1%) | 0.01 |
| Sodium azide (0.1 M) | 0.05 |
| Urate oxidase (0.02 unit [1]) | 0.03 |

[1] The unit of urate oxidase activity is defined as that quantity of enzyme which will catalyze the conversion of uric acid to allantoin at the rate of one micromole ($\mu$ mole) per minute at 25° C. using a uric acid substrate concentration of 20 mg./l.

There was then added 0.02 ml. of blood serum containing 9.2 mg. % of uric acid. The reaction was allowed to proceed for 5 minutes.

After completion of the initial reaction, the following formulation was lyophilized, reconstituted with water and added to the above solution:

|  | Ml. |
|---|---|
| Sodium citrate buffer (0.2 M, pH 4.5) | 0.15 |
| Peroxidase (1 mg./ml.—activity 200 units [2]/mg.) | 0.06 |
| Orthotolidine (25 mg./10 ml.) | 0.06 |

[2] The unit of peroxidase activity is defined as that quantity of enzyme which will catalyze the decomposition of hydrogen peroxide at the rate of 1$\mu$ mole per minute at 25° C.

A blue color developed within 10 seconds. The color was compared with a calibrated color chart and indicated 9 mg. percent of uric acid as present in the specimen.

To evaluate this procedure further the values obtained by means of the above test on various serum specimens were compared with those calculated from spectrophotometric data. A set of typical results is given below in Table 1.

TABLE 1.—CONCENTRATION OF URIC ACID IN SERUM SPECIMEN, MG. PERCENT

| Color Chart | Spectrophotometer |
|---|---|
| 1 | 1.7 |
| 3 | 2.6 |
| 3 | 3.4 |
| 4 | 4.2 |
| 6 | 5 |
| 6 | 7.1 |
| 7 | 6.3 |
| 7 | 7.4 |
| 9 | 9.2 |
| 11 | 10.8 |

The following example demonstrates the effectiveness of a lower concentration of urate oxidase.

*Example 2*

The procedure of Example 1 was repeated except that 0.01 ml. (0.007 unit) of urate oxidase was used. The lyophilized powder was reconstituted to 0.1 ml. with water. The data obtained from comparison with a calibrated color chart and by means of a spectrophotometer were compared and found to agree within the accuracy shown in Example 1.

The following example demonstrates the use of a different buffer for the hydrogen peroxide generating system.

*Example 3*

The procedure of Example 1 was repeated using a 0.1 M, pH 9.2 tris(hydroxymethyl)aminomethane buffer instead of the borate buffer. The results obtained were similar to those of Example 1.

The following example demonstrates the use of another catalase inhibitor.

*Example 4*

The procedure of Example 1 was repeated except for the use of a 0.2 M borate buffer at pH 8.5 and potassium cyanide as an inhibitor for catalase. The results obtained were similar to those of Example 1.

It has been found that any pH of about from pH 8.5 to pH 10.0 may be satisfactorily used.

The following example illustrates the use of a different hydrogen peroxide detecting system.

*Example 5*

The procedure of Example 2 was followed using as the detecting system a mixture of:

|  | Mg. |
|---|---|
| Sodium succinate (pH 5.0) | 17.7 |
| Peroxidase | 0.06 |
| Orthotolidine | 0.15 |

The mixture was lyophilized and reconstituted with water. Results obtained were similar to those of Example 2.

The following example illustrates a means for enhancing color differentiation.

*Example 6*

The procedure of Example 4 was followed except that 0.017 mg. of tartrazine (FD & C Yellow No. 5) was added to the chromogen reagent. Upon testing colors ranged from yellow-green to blue-green clearly differentiating between various concentrations of uric acid in blood serum as in Example 5.

In summary this invention provides a useful composition and method for detecting the quantity of uric acid present in blood serum. The composition comprises a hydrogen peroxide generating system such as a mixture of urate oxidase and a catalase inhibitor buffered at near the pH of optimum urate oxidase activity and a hydrogen peroxide detecting system such as a mixture of a chromogen and a substance having peroxidative activity which is effective to catalyze the oxidation of the chromogen by hydrogen peroxide buffered at near the optimum pH for color development.

It will be clearly understood by those skilled in the art that certain changes may be made in the above compositions and methods. It is therefore intended that all matter contained in the foregoing description shall be interpreted as illustrative and not in a limiting sense. It is also understood that other modifications may be made without departing from the spirit and scope of the instant invention.

What is claimed is:

1. A test system for the detection of uric acid in blood which comprises a hydrogen peroxide generating system comprising:
   urate oxidase,
   an inhibitor for catalase selected from the group consisting of alkali metal azides and alkali metal cyanides,
   a buffer effective to maintain the pH of the generating system in a range of about from pH 8.5 to pH 10 in which said urate oxidase is effective to convert uric acid to allantoin with the concomitant production of hydrogen peroxide
   and a detecting system for determining the quantity of hydrogen peroxide thus produced comprising
   a chromogen responsive to said hydrogen peroxide, a substance having peroxidative activity which is effective to catalyze the oxidation of said chromogen by hydrogen peroxide and a buffer effective to maintain the pH of the detecting system in a range of about from pH 4.5 to pH 5.5.

2. A test system according to claim 1 wherein the substance having peroxidative activity is peroxidase and the chromogen is orthotolidine.

3. A test system according to claim 1 wherein both the generating system and the detecting system are in the form of lyophilized solids.

4. A test system according to claim 1 wherein the hydrogen peroxide generating system includes a chelating agent capable of preventing heavy metal inhibition of the urate oxidase.

5. A test system according to claim 1 wherein the inhibitor catalase is sodium azide.

6. A test system according to claim 1 wherein the hydrogen peroxide generating system and the hydrogen peroxide detecting system are each formed into separate tablets.

7. A test system according to claim 4 wherein the chelating agent is ethylenediaminetetraacetic acid.

8. A process for detecting uric acid in blood serum which comprises treating blood serum with a hydrogen peroxide generating system comprising urate oxidase, an inhibitor for catalase selected from the group consisting of alkali metal azides and alkali metal cyanides, a buffer effective to maintain the pH of the generating system in a range of about from pH 8.5 to pH 10 in which said urate oxidase is effective to convert uric acid to allantoin with the concomitant production of hydrogen peroxide for a period sufficient to convert the uric acid present in the blood serum to allantoin with the concomitant production of hydrogen peroxide being quantitative and thereafter contacting the resulting mixture with a hydrogen peroxide detecting system comprising a chromogen, a substance having peroxidative activity effective to catalyze the oxidation of said chromogen by hydrogen peroxide with the production of a color change, and a buffer effective to maintain the pH of the resulting mixture in a range of about from pH 4.5 to pH 5.5 and thereafter observing the color developed and correlating same to the quantity of uric acid present in the blood.

9. A process according to claim 8 wherein the hydrogen peroxide generating system is allowed to react with the blood serum for a period not exceeding about 5 minutes.

10. A process according to claim 8 wherein the hydrogen peroxide generating system contains as a stabilizer for urate oxidase a heavy metal chelating agent.

References Cited

UNITED STATES PATENTS 2,990,338   6/1961   Gibson _____ 195—103.5

OTHER REFERENCES

Colowick et al. "Methods In Enzymology," vol. II, pp. 485, 489 and 763–4, 1955.

MORRIS O. WOLK, *Primary Examiner.*

Z. PAROCZAY, L. MEI, *Assistant Examiners.*